United States Patent [19]
Harris

[11] 3,996,845
[45] Dec. 14, 1976

[54] AIR HANDLING GRILLE AND METHOD OF MAKING THE SAME

[75] Inventor: William J. Harris, Tunkhannock, Pa.

[73] Assignee: Anemostat Products Division, Dynamics Corporation of America, Scranton, Pa.

[22] Filed: July 16, 1975

[21] Appl. No.: 596,268

[52] U.S. Cl. ............................... 98/114; 98/40 V; 98/110; 98/121 A
[51] Int. Cl.² ...................................... F24F 13/14
[58] Field of Search ............ 98/114, 101, 103, 107, 98/108, 110, 121, 40 V; 49/463, 465, 57; 29/160; 52/660

[56] References Cited
UNITED STATES PATENTS

| | | | |
|---|---|---|---|
| 524,310 | 8/1894 | Cohen | 98/114 X |
| 723,433 | 3/1903 | Arend | 98/114 X |
| 2,722,170 | 11/1955 | Broberg | 98/114 |
| 3,641,913 | 2/1972 | Dennis | 98/110 X |
| 3,762,303 | 10/1973 | Hoffman | 98/114 |

FOREIGN PATENTS OR APPLICATIONS

| | | | |
|---|---|---|---|
| 408,422 | 4/1968 | Australia | 98/110 |
| 1,237,579 | 10/1959 | France | 98/40 V |

*Primary Examiner*—William E. Wayner
*Assistant Examiner*—Harold Joyce
*Attorney, Agent, or Firm*—McCormick, Paulding & Huber

[57] ABSTRACT

An air handling grille with an open rectangular frame which defines two opposing grooves each bounded by a narrow flange. A series of adjustable vanes each with opposite bearing studs is preassembled with elongated resilient bearing members. Each bearing member has a series of small openings to hold the bearing studs. The bearing members are mounted on the studs during preassembly and the members are thus entered in the grooves. Each member includes a flange which is deflected inwardly during assembly and thereafter latches the bearing members in assembled position. The flanges also tend to twist the bearing members restricting bearing openings therein and frictionally retaining the studs. A second series of vanes is supported by a pair of cross members. Spring clips secure the vanes on engagement with ends of the cross members.

16 Claims, 7 Drawing Figures

AIR HANDLING GRILLE AND METHOD OF MAKING THE SAME

BACKGROUND OF THE INVENTION

Air handling grilles have heretofor been provided with first and second or front and rear series of vanes, the series of vanes being relatively arranged at right angles and one or both series of vanes being removable from the supporting frame. Such grilles have been generally satisfactory but have exhibited certain disadvantages in ease and convenience of removal of vanes, economy of manufacture, and integrity of the frictional retention of adjustable vanes.

SUMMARY OF THE INVENTION

It is the general object of the present invention to provide an air handling grille of the type mentioned wherein at least one series of adjustable vanes is adapted for preassembly with a pair of bearing members, at least one of said bearing members being provided with an integral latching element, and the preassembled vanes and bearing members being readily assembled with and disassembled from a supporting frame, the frame, vanes, and bearing members being capable of manufacture and assembly at economic advantage.

It is the further object of the invention to provide an air handling grille of the type mentioned wherein at least one of the aforesaid bearing members is provided with a latching element adapted to provide a dual function, the said element serving to latch its bearing member in assembled position in the frame and also serving to enhance the frictional retention of small bearing studs on the vanes in corresponding bearing openings in the bearing members.

A still further object of the invention resides in the provision of an assembly method which may be practiced with a high degree of ease and convenience and at economic advantage.

DETAILED DESCRIPTION OF THE PREFERRED EMBODIMENT

Figure 1:
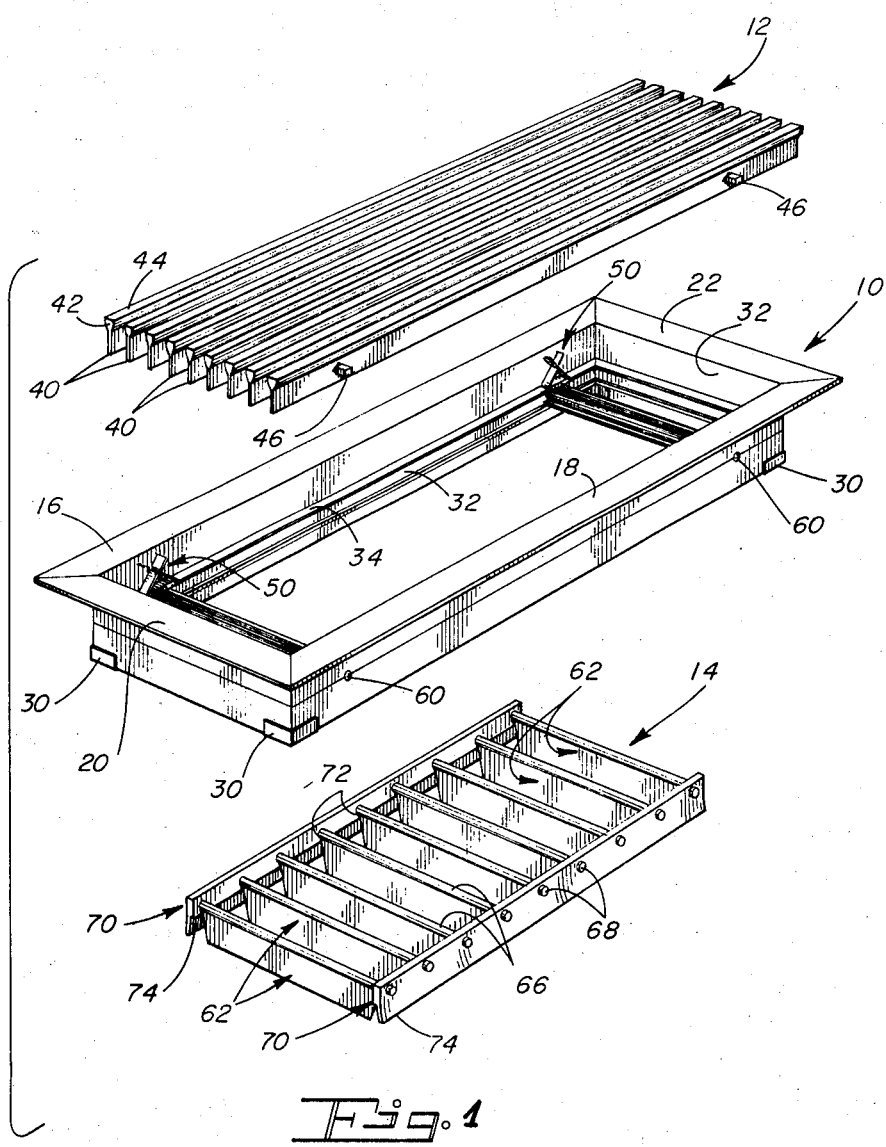
FIG. 1 is an exploded view of an air handling grille constructed in accordance with the present invention and embodying the method of the present invention.

Referring particularly to FIG. 1, an air handling grille constructed in accordance with the present invention comprises an open rectangular frame 10, and preassembled front and rear sets or series of elongated air directing vanes 12 and 14. The grille may vary in both length and width and sectional construction is also contemplated within the scope of the invention. For example, the grille frame may comprise left and right hand end sections assembled with an intermediate section and, similarly, one or both of the sets of vanes may be of sectional construction.

The frame 10 may vary widely in construction but as illustrated and as presently preferred, the frame is of the extruded aluminum type with opposing parallel sides sections 16, 18 and opposing parallel end sections 20, 22 all of identical cross sectional configuration. The said cross sectional configuration is generally L-shaped including a laterally outwardly projecting front flange and a rearwardly extending body member. First and second slots 24, 26 extend along the rear surface of the front flange of each section, FIGS. 3 and 5, and the latter slot is of T-shaped cross section with an L-shaped bracket entered therein at each of the slot corners formed between adjacent side and end sections. At a rear edge of each corner or junction area the side and end sections of the frame are held in assembled relationship by means of a spring type corner clip 30. Each of the corner clips 30 is generally U-shaped in cross section but is L-shaped viewed from the rear of the frame so as to be engaged over rear edges of contiguous end and side frame sections and frictionally retained thereon.

Figure 2:
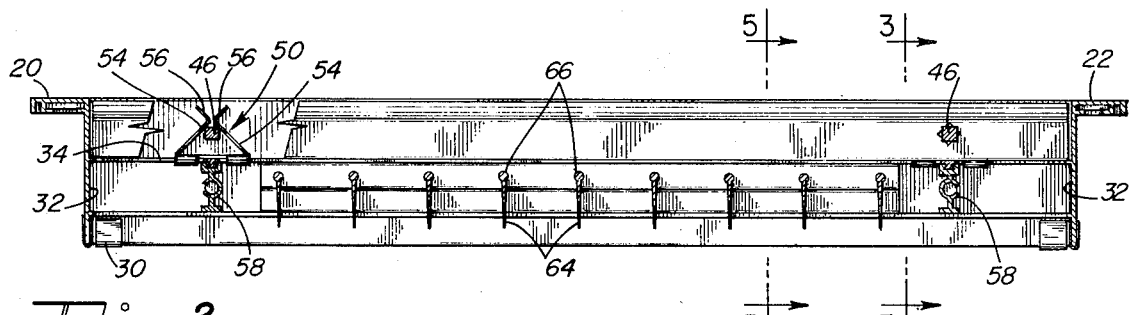
FIG. 2 is a longitudinal sectional view through the air handling grille of FIG. 1.
Figure 3:
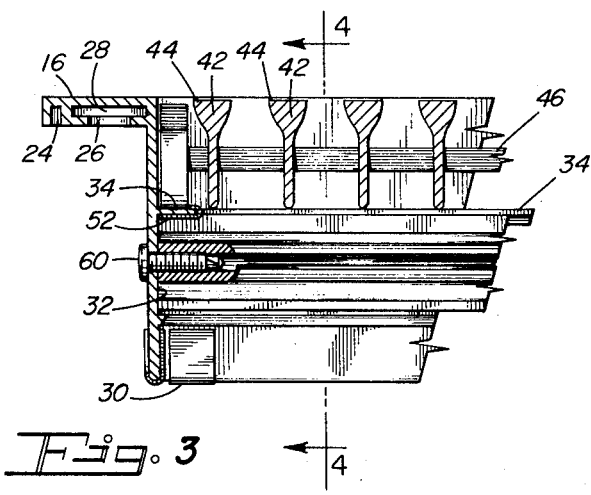
FIG. 3 is an enlarged fragmentary longitudinal section taken generally as indicated at 3—3 in FIG. 2.
Figure 5:
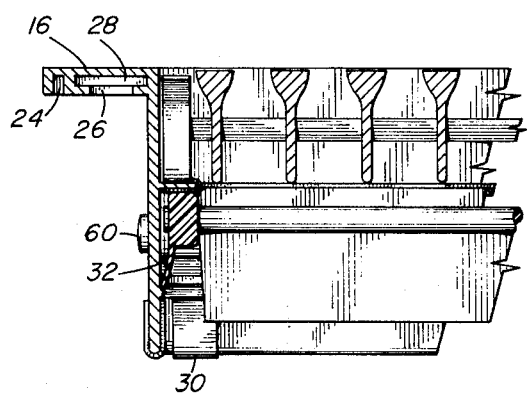
FIG. 5 is an enlarged fragmentary section taken generally as indicated at 5—5 in FIG. 2.

In accordance with the invention each section of at least one of the pairs of end and side sections has an inwardly open longitudinally extending groove defined therein. In the embodiment of the invention shown, such a groove is conveniently provided at 32 in all of the sections 16, 18, 20, 22 in the extrusion process. In FIGS. 3 and 5 the groove 32 in the side section 16 may be regarded as representative of grooves 32,32 extending throughout the inner wall of the frame i.e. across end sections 20, 22, FIG. 2, and along side section 18, not shown. The grooves or groove sections 32,32 along the end sections 20, 22 are not used in the present invention but the opening grooves or groove sections 32,32 in parallel relationship across the frame opening and formed respectively in the frame side sections 16 and 18 are an important feature of the invention and are employed in a specific manner set forth hereinbelow.

Figure 7:
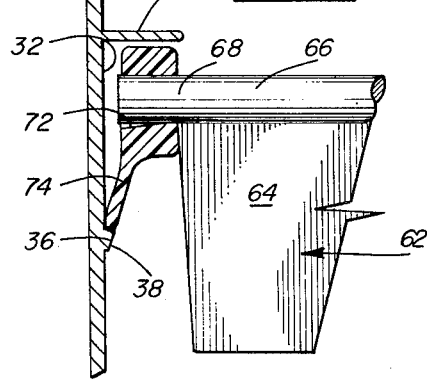
FIG. 7 is a view similar to FIG. 6 but also illustrating a portion of the grille frame, a groove receiving the bearing member of FIG. 6, and the bearing member in a position of assembly with its latching member deflected from its free position to a latching position.

Each groove section 32 is defined by a front flange 34 as best illustrated in FIG. 7 and, in accordance with the invention, at least one of the grooves in the side sections 16, 18 has a narrow inwardly projecting flange extending along and defining a rear longitudinal edge thereof. As shown, all of the grooves or groove sections 32,32 have a rear longitudinal edge defined by a narrow inwardly projecting and longitudinally extending flange 36. Preferably, each of the flanges or flange sections 36,36 in the frame side sections 16, 18 has an inclined inner surface 38 which extends angularly inwardly toward the center of the frame when viewed from the rear, FIG. 7. The inclined surfaces 38,38 serve a purpose to be set forth more fully hereinbelow.

Figure 4:
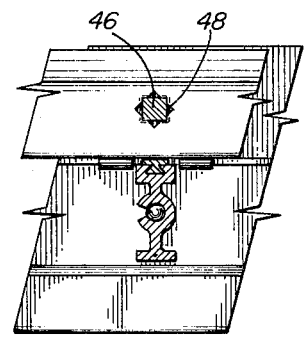
FIG. 4 is an enlarged fragmentary section taken generally as indicated at 4—4 in FIG. 3.

The flanges or flange sections 34,34 are spaced somewhat rearwardly from the front of the frame for accommodation of a front set or series of air directing vanes 12. As best illustrated in FIG. 1, a preassembled set or series of vanes 12 comprises a spaced parallel series of similar elongated air directing vanes 40,40. Nine such vanes are shown but the number may of course vary within the scope of the invention. Similarly, the mode of construction of the vanes may vary but an extruded aluminum construction is presently preferred with an enlarged front section 42 on each vane and a flat front surface at 44. As best illustrated in FIG. 2 et sequa, elongated square cross members 46,46 secure the vanes 40,40 of the series 12 in preassembled spaced parallel arrangement and, projecting end portions of the members 46,46 also serve to secure the vane subassembly in final assembled position within the frame 10. The cross members 46,46 are entered laterally with respect to the vanes 40,40 through small square openings 48,48, FIGS. 2 and 4. It will be observed, however, that after entry the cross members 46,46 are rotated through approximately 45° with respect to the openings 48,48 so as to create an interference with the edges of the openings 48,48 and thereby to secure the vanes and cross members in preassembled positions as in FIG. 1. The interference between the edges of the square cross members 46,46 and the edges of the openings 48,48 is such as to slightly deform th edges and thus to provide a permanent assembly of vanes and cross members.

The manner in which the end portions of the cross members 46,46 serve to retain the preassembled vanes and cross members in assembled position within the frame 10 will be apparent from inspection of FIGS. 1 and 2. At each end portion of a cross member 46 there is provided within the frame 10 a small spring clip 50. Each spring clip 50 has a generally U-shaped body portion 52 which slides over and is frictionally retained on a flange 34. Formed integrally with the body portion 52 of each clip is a pair of similar spring arms 54,54 which cooperatively form a rearwardly open V-shaped spring retention zone for an end portion of a cross member 46. The apex of the "V" is directed forwardly and split and, preferably a small wing 56 on each of the arms 54,54. The wings 56,56 are formed integrally and cooperatively provide a small forwardly facing V-shaped camming means. That is, it will be apparent that an end portion 46 of a cross member engaging the wings 56,56 will tend to cam the arms 54,54 outwardly and open whereby to permit entry of the end portion to the position shown in FIG. 2. In such position the arms 54,54 spring inwardly engaging the end portion 46 of the cross member and tend to urge the same rearwardly thus securely retaining the cross member and its associated vanes in the frame. Preferably, and as best illustrated in FIGS. 3 and 5, rear edge portions of the vanes 40,40 engage the flanges 34,34 on the end sections 20, 22 of the frame whereby to cooperate with the end portions of the cross members 46,46 and the spring clips 50,50 in securely retaining the front series of vanes 12 within the frame 10. The said series of vanes is nevertheless removable from the frame on relative forward movement of the same withdrawing the end portions of the cross members 46,46 from their respective spring clips 50,50.

Preferably, reinforcing or back-up members are provided in the grille frame as at 58,58. The members 58,58 may be of extruded aluminum construction and serve with opposite end portions thereof entered respectively in groove sections 32,32 in the side frame sections 16, 18 to back-up or reinforce the vanes 40,40 of the vane series 12. Further, and in the aforementioned sectional construction when a center section of a frame requires lateral strengthening, it will be apparent that members 58,58 will serve to provide such a function. The members are secured in position by appropriate screws 60,60 entered through the side frame members 16, 18. The longitudinal location of the members 58,58 is preferable as shown in FIG. 2. That is, the said members are preferably arranged in front to rear alignment and behind the cross members 46,46, the members 58,58 being thus rendered substantially invisible from the front of the grille.

The set or series of air directing vanes 14 disposed at a rear position in the grille 10 but which of course may be otherwise located and oriented within the scope of the invention, is similar to the series of vanes 12 described above except for a provision for angular adjustment of the vanes in the series 14. That is, individual vanes 62,62 are arranged in a spaced parallel series and each of the vanes is adapted for angular adjustment about an axis which extends longitudinally thereof. Nine vanes 62,62 are shown and the vanes are substantially shorter than the aforementioned vanes 40,40 and in assembled position within the grille frame 10 the vanes 40,40 and 62,62 are right angularly arranged.

Construction of the vanes 62,62 may vary widely but aluminum extrusions are presently preferred and, as best illustrated in FIGS. 1 and 2, each of the vanes 62 has a vane body portion 64 which tapers slightly toward its rear side and a cylindrical portion 66 extending along a front or opposite side of the vane and slightly beyond the ends thereof. The cylindrical portion 66 of each vane, at its projecting end portions, forms small bearing studs 68,68. The small bearing studs 68,68 are of course coaxial with the cylindrical portion 66 and, the aforementioned longitudinal axis of angular adjustment is coincident with the axis of the cylindrical portion 66 and the bearing studs 68,68.

As indicated above, the length of the vanes 62,62 may vary but it is important to establish a particular relationship in a given grille between vane length and the aforementioned grooves 32,32 and flanges 36,36 along the side frame sections 16, 18. That is, the overall length of each vane 62 including its oppositely projecting bearing studs 68,68 should be less than the distance between the base wall of one groove 32 and the inner edge of a flange 36 on an opposite wall of the frame. This relationship accommodates a pivotal or swinging assembly step of the vane series 14 as more fully explained hereinbelow, and preferably, a "straight in" assembly step is also provided for. That is, the vanes 62 are shown with an overall longitudinal dimension including their opposite bearing studs which is slightly less than the distance across the frame between the inner edges of the narrow flanges 36,36.

With the vanes 62,62 arranged in spaced parallel relationship as in FIG. 1, a preassembly step may be accomplished through the mounting of a pair of similar elongated resilient bearing members 70,70 on the projecting bearing studs 68,68. That is, each of the members 70,70 is provided with a longitudinal series of small bearing openings 72,72 each adapted to frictionally receive and adjustably hold a bearing stud 68. With the bearing openings aligned and with the opposite studs 68,68 of the vanes entered therein all of the vanes are adjustably secured in the subassembly or vane series 14 of FIG. 1. While the construction of the bearing members 70,70 may vary widely, it is preferred that a resilient plastic material be employed, polypropylent and nylon being well-suited to the intended purpose.

The cross sectional configuration of the bearing members 70,70 is also subject to variation but, in accordance with the present invention, at least one of said members is provided with an integrally formed latching element and, as shown, the said members are identical with each member having an integral latching element 74. As shown, the latching elements 74,74 on the members 70,70 perform dual functions. The said elements serve to latch the subassembly or vane series 14 in assembled position in the frame 10 when the bearing members 70,70 are entered respectively in grooves 32,32 in the side frame sections 16, 18. Further, and as will be seen, the latching elements serve, on entry of the bearing members into their respective grooves, to reduce the size of the openings 72,72 in the bearing members and to thereby enhance the frictional retention of the bearing studs 68,68 in the openings. Obviously, accidental or unintended angular adjustment of vanes 62,62 is thus avoided.

Figure 6:
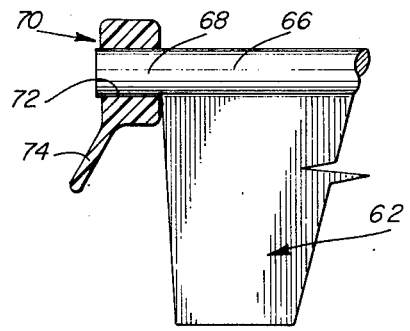
FIG. 6 is a further enlarged fragmentary section showing an end portion of an air directing vane and an associated bearing member, the bearing member having an integral latching element in a free position.

As best illustrated in FIGS. 6 and 7, the latching elements 74,74 take the form of a thin elongated flange extending along an edge of the respective bearing members 70,70. Each flange 74 is angularly inclined laterally from the main body of the bearing member and each such flange is deflectable angularly inwardly as illustrated in FIG. 6. With the bearing members 70,70 mounted on the studs 68,68, the latching elements 74,74 are inclined so as to project generally longitudinally outwardly with respect to the associated vane 62,62 and also to project beyond the end of the associated stud 68. Thus, when a bearing member 70 is entered in a groove 32, FIG. 7, the latching element is deflected generally longitudinally inwardly and remains in engagement with a base wall of the groove whereby to prevent accidental or unintended rearward withdrawal of the bearing member and the assembled vane series 14. Preferably, and as illustrated in FIG. 7, the latching element 74 is maintained in a condition of at least partial deflection by the base wall of its associated groove 32 and, in such condition, the latching element serves its second function. That is, the element is spaced from the bearing open 72 to provide a pivot arm and thus tends to twist the resilient bearing member in a direction restricting the inner ends of the bearing opens 72,72. With the walls of the bearing openings at their inner ends in firm engagement with the bearing studs 68,68, it will be obvious that the frictional retention of the studs is enhanced as aforesaid.

As will also be apparent in FIGS. 6 and 7, the latching element 74 is deflectable generally longitudinally inwardly during assembly of the vane series 14 with the grille frame 10. Once the bearing member 70 shown is entered in the groove the deflection of the latching element may be somewhat less for fulfillment of its second function i.e. enhancement of frictional retention of the studs 68,68. If the second function is deemed unnecessary, the latching element may be so designed as to assume substantially its free FIG. 6 position within the groove 32 and, in such event, the element will serve merely to retain the bearing member in the groove by engaging the narrow flange 36 on rearward movement of the vane series 14. The dual function operation of the latching element is presently preferred, however, as is the provision of the latching elements on each of the bearing members 70,70.

The function of the aforementioned inclined inner surface 38 on each flange 36 will now be apparent. As a bearing member 70 is moved forwardly to enter a groove 32 its associated latching element 74 will engage the surface 34 and the said surface will serve to cam the latching element 74 inwardly to clear the flange and to permit the bearing member to enter the groove. In order to remove the bearing member from the groove it is necessary to enter an elongated flat instrument behind the latching element or flange 74 and to deflect the same inwardly to clear the flange 36 while the vane series 14 is simultaneously moved rearwardly with respect to the frame.

In practicing the method of the present invention, the three subassemblies 10, 12 and 14 of FIG. 1 may be provided and the vane series 12, 14 thereafter assembled with the frame 10 in any desired sequence of operations. Assembly of the vane series 12 requires merely a relative downward or rearward movement from the position shown in FIG. 1 entering the end portions of the cross members 46,46 in the spring clips 50,50 as illustrated in FIG. 2. The vane series or subassembly 14 is moved relatively upwardly or forwardly in FIG. 1 and when a pivotal or swinging assembly action is employed, one bearing member 70 is first entered in a groove 32 and the vane series is then swung upwardly and forwardly at an opposite side to enter the second bearing member 70 in its corresponding groove 32. When the "straight in" assembly method is followed, the vane series 14 is moved bodily forwardly in a plane parallel to that of the frame, the bearing members 70,70 simultaneously pass the narrow flanges 36,36, the latching flanges or elements 74,74 simultaneously engage the camming surfaces 38,38, and are thereby simultaneously deflected inwardly resulting in a snap action entry of the bearing members into their respective grooves.

As will be apparent from the foregoing, the grille of the invention can be constructed substantially throughout of aluminum extrusions and thus at economic advantage. The aforementioned objects are yet fulfilled and a desirably simple construction is provided having a high degree of structural integrity and dependability in long use.

I claim:

1. An air handling grille comprising an open rectangular frame adapted to be mounted in an aperture for the passage of air therethrough, said frame having a pair of opposing parallel end sections and a pair of opposing parallel side sections, each section of at least one of said pairs of sections having an inwardly open longitudinally extending groove defined therein, said two grooves being in parallel opposing relationship across the frame opening, and at least one of said grooves having a narrow inwardly projecting flange extending along and defining one longitudinal edge thereof, a spaced parallel series of similar elongated air directing vanes each adapted for adjustment about an axis extending longitudinally thereof and each having similar oppositely projecting bearing studs with axes substantially coincident with said adjustment axis, the overall longitudinal dimension of each of said vanes including its opposite bearing studs being less than the distance between the inner edge of said flange and the base of the opposite groove, a pair of similar elongated resilient bearing members spaced apart in parallel relationship and disposed respectively in said grooves, each of said bearing members being provided with a longitudinal series of small openings each adapted to frictionally receive and adjustably hold a bearing stud, said openings being aligned across said frame opening and opposite studs of the vanes being frictionally held therein whereby to adjustably secure all of said vanes and said bearing members in assembled positions in said frame, and at least one of said bearing members having an integrally formed latching element thereon, said latching element having a free position projecting generally longitudinally outwardly with respect to said vanes whereby to extend outwardly beyond said inner edge of said flange and to latch said bearing member in said groove, and said latching element also being deflectable generally longitudinally inwardly to clear said flange inner edge.

2. An air handling grille as set forth in claim 1 wherein said integral latching element on said one bearing member resides in engagement with a wall of its corresponding groove and is thereby maintained in a condition of at least partial deflection tending to reduce the size of its bearing openings and thus enhancing the frictonal retention of the bearing studs therein.

3. An air handling grille as set forth in claim 2 wherein said integral latching element is spaced from the bearing openings in its bearing member and tends to twist the resilient member in a direction restricting the inner ends of the bearing openings and thus enhancing the frictional retention of bearing studs as aforesaid.

4. An air handling grille as set forth in claim 3 wherein said integral latching element takes the form of a flange extending angularly outwardly from the bearing member and which is deflectable angularly inwardly to clear the narrow flange and deflectable to a lesser degree when residing in engagement with the base wall of its corresponding groove.

5. An air handling grille as set forth in claim 4 wherein said angularly extending flange is so inclined as to be engaged and cammed inwardly by said narrow flange on movement of its associated bearing member from a position outwardly of its groove into said groove.

6. An air handling grille as set forth in claim 2 wherein a narrow flange is provided adjacent the said other frame groove and forms an edge thereof, wherein said other bearing member includes an integral latching element identical with the latching element on said one bearing member.

7. An air handling grille as set forth in claim 6 wherein said frame has front and rear portions with the aforesaid grooves disposed at a rear portion thereof, wherein a second series of parallel spaced apart similar elongated air directing vanes is provided at the front portion of the frame and arranged perpendicularly with respect to the first series of vanes.

8. An air handling grille as set forth in claim 7 wherein said second series of vanes is secured in position within front portion of the frame for ready removal therefrom, said vanes being provided with cross members for supporting the same, and said frame being provided with spring clip means for engaging and removably securing the ends of the cross members.

9. An air handling grille as set forth in claim 6 wherein at least two elongated back-up members are provided for said second series of vanes, said members having opposite end portions entered in said opposite grooves and having intermediate portions disposed rearwardly of the second series of vanes and in supporting engagement therewith.

10. A method for making an air handling grille comprising the steps of providing an open rectangular frame adapted to be mounted in an aperture for the passage of air therethrough and having a pair of opposing parallel end sections and a pair of opposing parallel side sections, each section of at least one of said pairs of sections having an inwardly open longitudinally extending groove defined therein, said two grooves being in parallel opposing relationship across the frame opening, and at least one of said grooves having a narrow inwardly projecting flange extending along and defining one longitudinal edge thereof, providing a spaced parallel series of similar elongated air directing vanes each adapted for adjustment about an axis extending longitudinally thereof and each having similar oppositely projecting bearing studs with axes substantially coincident with said axis of adjustment, the overall longitudinal dimension of each of said vanes including its opposite bearing studs being less than the distance between the inner edge of said flange and the base of the opposite groove, providing a pair of similar elongated resilient bearing members each having a longitudinal series of small openings each adapted to frictionally receive and adjustably hold a bearing stud, and at least one of said bearing members having an integrally formed latching element with a free position wherein it projects generally laterally from the body of the member and a deflected position wherein it is urged laterally toward the body of the bearing member, assembling said vanes and bearing members with the bearing members mounted on the studs at opposite ends of the vanes and with the latching element on said one member projecting generally longitudinally outwardly with respect to the vanes, and assembling the preassembled vanes and bearing members with the frame by entering the said bearing members in the corresponding grooves with said latching element being deflected generally longitudinally inwardly to clear said inner edge of said narrow flange and thereafter springing outwardly to latch said one bearing member in its groove and to thus secure said vanes and bearing members in assembled positions in the frame.

11. A method for making an air handling grille as set forth in claim 10 wherein each of said bearing members is provided with an integral latching element, wherein each of said grooves has an adjacent narrow flange defining an edge thereof, and wherein each said latching element is deflected longitudinally inwardly during entry of the preassembled vanes and bearing members into the frame, each of said latching elements thereafter springing outwardly to latch the bearing members in their respective grooves and to thus secure assembly of the vanes and bearing members in the frame.

12. A method for making an air handling grille as set forth in claim 11 wherein each of said latching elements is engaged by a base wall of its associated groove after entry of the bearing member into the groove to maintain the latching element in a condition of partial deflection and to thereby restrict the bearing openings in the bearing members and enhance the frictional retention of the bearing studs in the openings.

13. A method for making an air handling grille as set forth in claim 11 wherein a second series of air handling vanes is provided with the vanes extending in parallel relationship and with supporting cross members engaging and holding the vanes in preassembled condition, assembling said second series of vanes into the frame with the vanes of said first and second series right angularly arranged.

14. A method for making an air handling grille as set forth in claim 13 wherein said frame is provided with spring clip means, and wherein said supporting members for said second series of vanes are engageable at their ends with said spring clip means on assembly of said series of vanes with the frame, the said second series of vanes thus being removably secured in assembled position.

15. A method for making an air handling grille as set forth in claim 14 wherein at least two back-up members are provided for said second series of vanes, wherein said back-up members are positioned in the frame with opposite end portions thereof entered in said grooves, and wherein said second series of vanes is thereafter assembled with the frame with rear portions of the vanes engaged and supported by the back-up members.

16. A method for making an air handling grille as set forth in claim 11 wherein the overall longitudinal dimension of each of said vanes including its opposite bearing studs is less than the distance between the inner edges of said narrow flanges, and wherein said step of assembling the preassembled vanes and bearing members with the frame is accomplished in a "straight in" movement with the vane and bearing member subassembly and frame being held in parallel planes and relative movement thereof accomplished toward each other and into assembly.

* * * * *